United States Patent [19]
Robinson

[11] 4,111,317
[45] Sep. 5, 1978

[54] PLATFORM LIFT

[76] Inventor: Morris D. Robinson, 179 Via Los Mira Dores, Redondo Beach, Calif. 90277

[21] Appl. No.: 828,814

[22] Filed: Aug. 29, 1977

[51] Int. Cl.² .................................................. B60P 1/48
[52] U.S. Cl. .................................................... 214/77 P
[58] Field of Search ........................ 214/77 P, DIG. 10

[56] References Cited

U.S. PATENT DOCUMENTS

| | | | |
|---|---|---|---|
| 3,084,815 | 4/1963 | Johnson | 214/77 P |
| 3,602,381 | 8/1971 | Size et al. | 214/77 P |
| 3,771,672 | 11/1973 | Randall | 214/77 P |
| 3,842,997 | 10/1974 | Sprikkelman | 214/77 P |

*Primary Examiner*—Albert J. Makay
*Attorney, Agent, or Firm*—Donald D. Mon

[57] ABSTRACT

A platform lift mountable to structures such as trucks or loading docks, which lift includes a platform that can be raised and lowered while horizontal and can be tipped to an upright raised position. The platform is carried by a compound hinge that includes parallelogram means which in one parallelogram configuration raises and lowers the platform in a horizontal alignment, and which when it encounters selective restraint means, assumes a different parallelogram configuration in which the platform is raised to an erect alignment.

14 Claims, 6 Drawing Figures

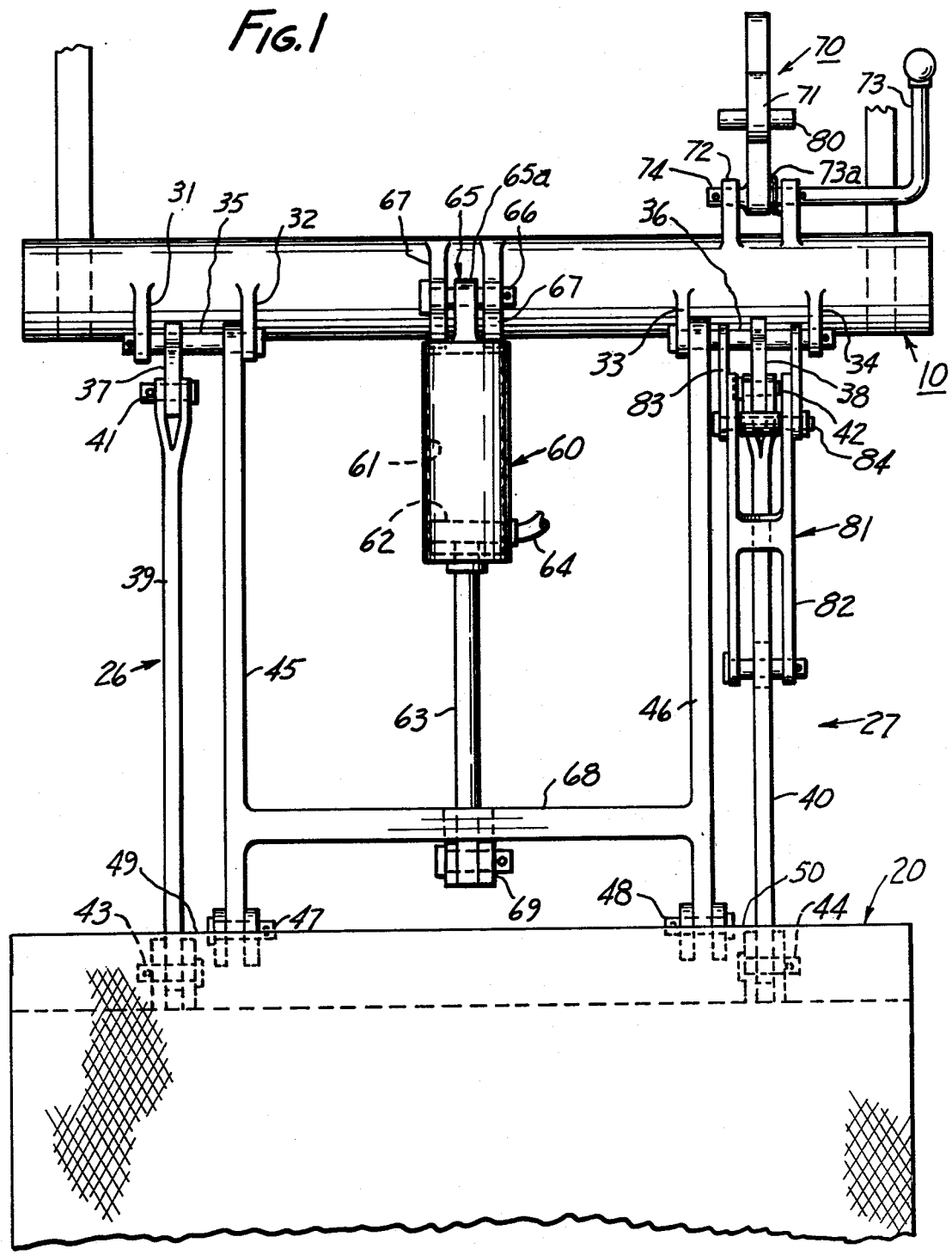

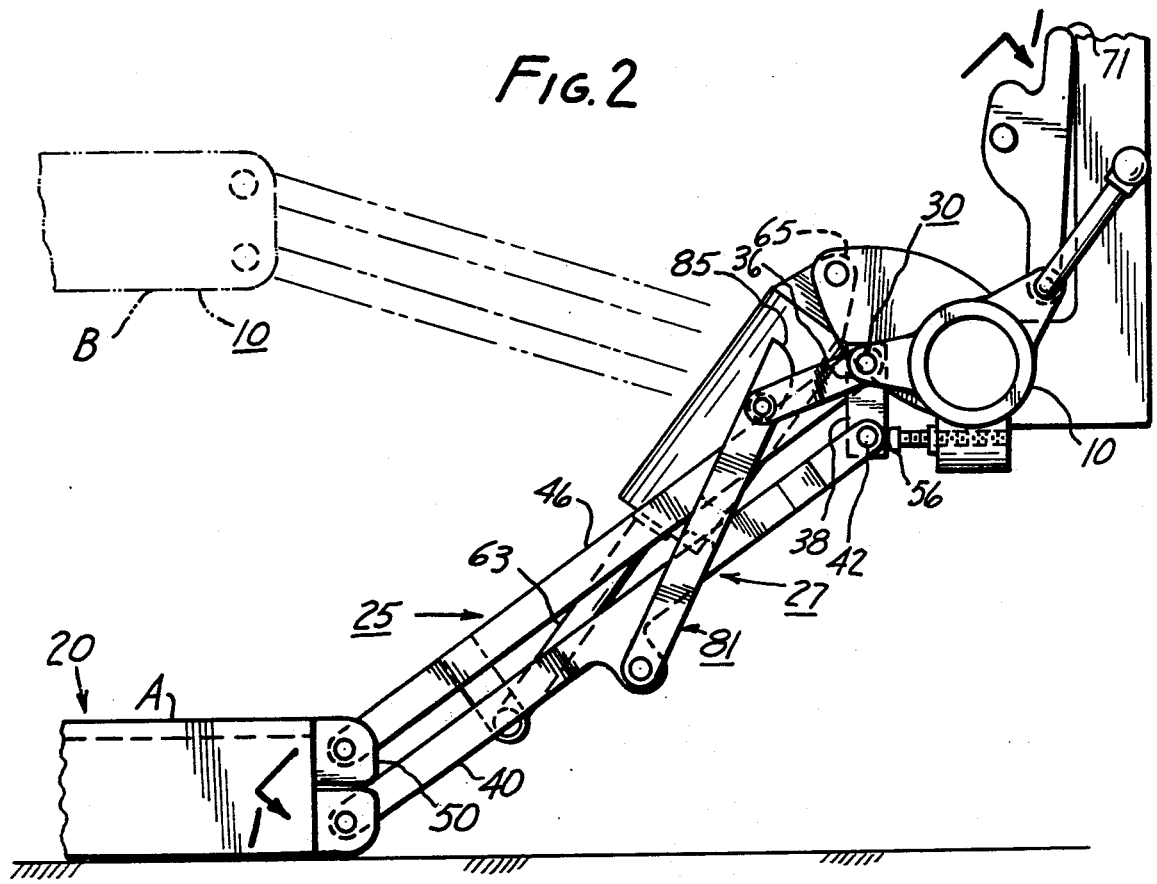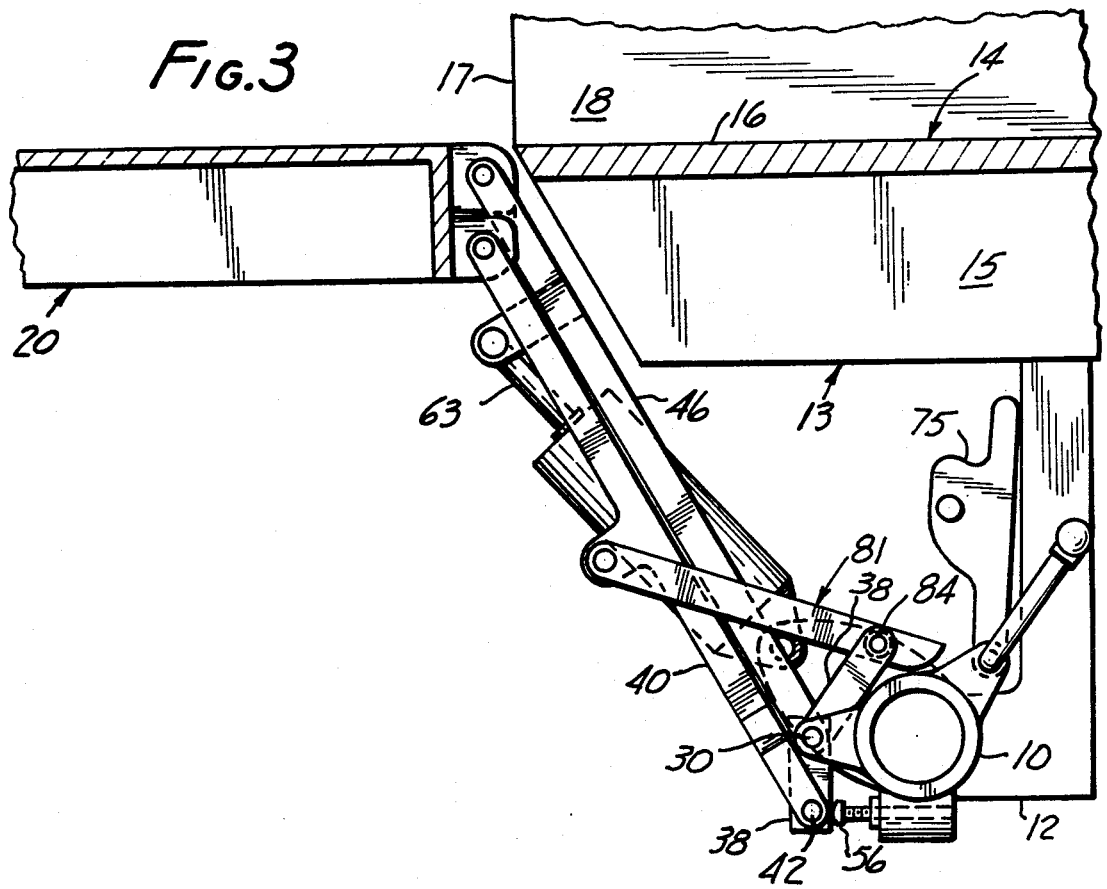

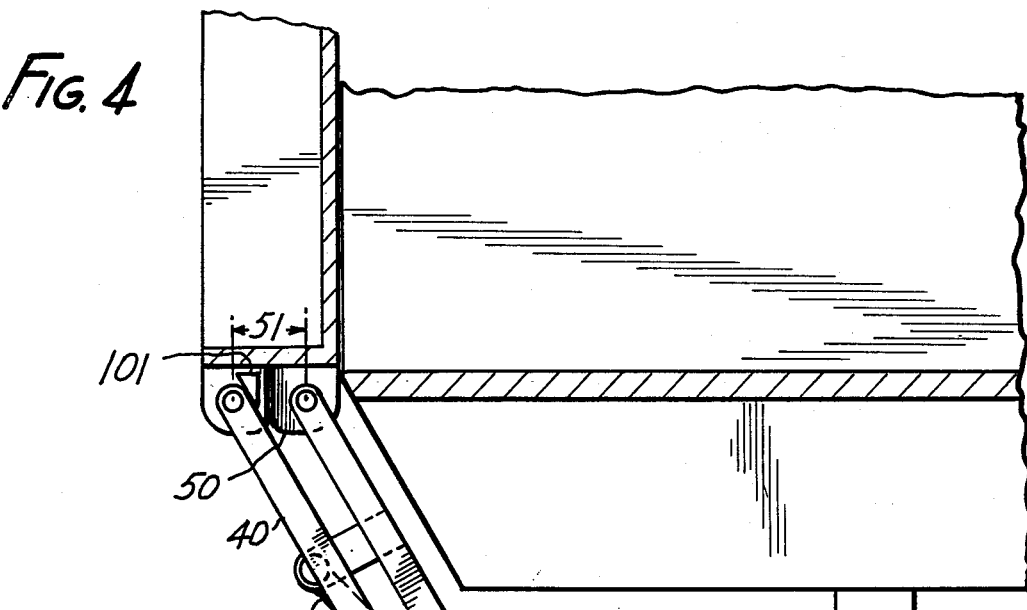
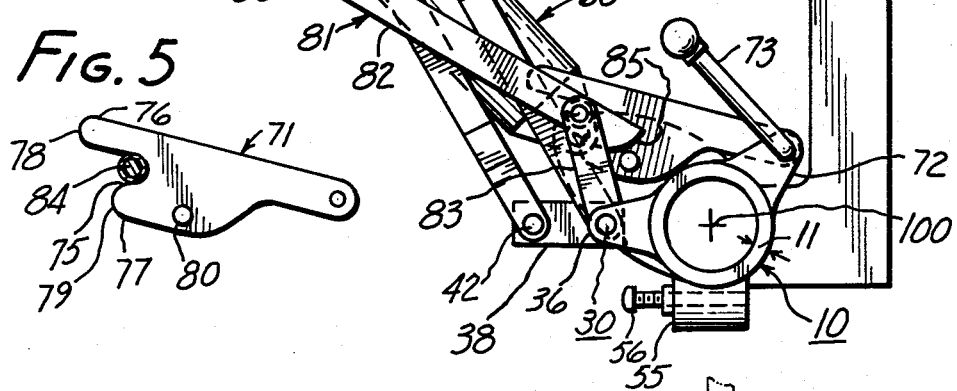
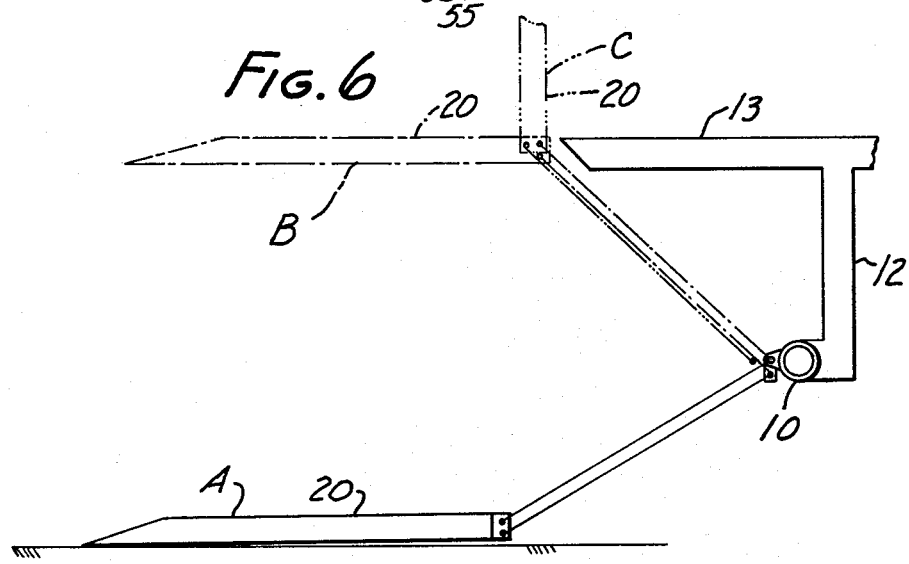

PLATFORM LIFT

This invention relates to platform lifts.

Platform lifts are well known. A frequently encountered example is their use as a tailgate for trucks wherein a platform can be raised and lowered between ground elevation and an upper elevation. In addition to vehicular applications such lifts can be used in stationary installations.

The prior art includes examples of platform lifts, for example Randall U.S. Pat. No. 3,771,672. It is a classical objective of these lifts to provide a platform which can be maintained horizontal as it goes up and down. It is also desirable to be able to raise the platform to an upper elevation but then instead of the platform being in a horizontal alignment, to tilt it to an erect, usually vertical position. In this position it might be nested next to the truck bed so as to close the rear entrance to the truck, or perhaps be brought against the building to prevent entry.

The prior art includes examples of lifts which provide both of the above functions. However, known devices have various disadvantages, for example complexity, and in some cases unreliability. It is evident that the operator, when he uses the lift, should be assured that the platform will, when it arrives at its upper position, be either horizontal or upright as he planned it to be, and that there is no uncertainty or possibility of a change in mode of operation in the middle of a sequence. Also, especially when the platform is being loaded while subject to vibration, it is essential that it not be subject to abrupt change in position as a consequence of vibration. For example, it would be extremely dangerous for the platform to start to raise to its erect alignment but in the middle of this operation unexpectedly to fall back to its horizontal position. In brief, what is required is a simple device which is substantially vibration proof, whose direction and mode of operation are certain, and whose operation is safe and reliable.

As elementary as the above objectives may appear to be, and as rugged and as simple as the constructions of various existing platform lifts may appear to be, still platform lifts are surprisingly difficult to design, and include many inherent complications. Their actuating mechanisms have relatively short strokes, and throughout the device there are regions of unusually high unit loadings. Long arms and bars which are subject to bending, or deflectable devices which can jam or hang up in the middle of their operation, are undesirable. A unit having these disadvantageous components is a source of potential danger. The instant device is elegantly simple, extremely rugged and reliable, and resistant to various high static and vibration loads without being cumbersome or complicated.

A platform lift according to this invention includes support structure by which the lift is attached to a next assembly such as a truck or a stationary structure. A compound hinge mounts a platform to the support structure. The hinge comprises a parallelogram movement with four links. A portion of the platform comprises one link of the parallelogram movement. Limiting means is provided for maintaining a base link in a predetermined position during one of the modes of operation, and selectable restraint means is provided for selectively restraining (or not restraining) another of the links in another mode of operation, whereby selectively to provide two possible basic parallelogram configurations, each respective to a different mode of operation of the lift.

According to a preferred feature of the invention, the restraint means includes abutment means having a pair of positions, in one of which positions one mode is permitted, and in the other of which positions the other mode is required. This restraint means carries deflector means which prevents uncertainty of selection of the modes.

The above and other features of this invention will be fully understood from the following detailed description, and the accompanying drawings in which:

FIG. 1 is an oblique view taken at line 1—1 in FIG. 2 showing the presently preferred embodiment of the invention;

FIG. 2 is a right hand side view of FIG. 1 with the platform in its lowermost position;

FIG. 3 is a view similar to FIG. 2 showing the platform raised in one of its modes;

FIG. 4 is a view similar to FIG. 2 showing the platform raised in another of its modes;

FIG. 5 is a fragmentary view of a portion of the device of FIG. 2; and

FIG. 6 is a schematic showing of the various positions which the platform can assume.

FIG. 1 shows rigid support structure 10 which preferably is in the form of a thick-walled steel tube. The tube has a wall thickness 11, and can be attached by welding or otherwise to any suitable base 12 such as a hanger. Hanger 12 comprises an "L" shaped member attached to the underside of a truck bed 14. Bed 14 has beams 15 beneath a deck 16. The vehicle has a rear opening 17 through which a load can be passed. Side 18 of the truck is schematically in cutaway notation shown in FIG. 3. If the support structure were mounted to a loading dock, the corresponding opening could be a door frame, for example.

It is the object of this invention to move a rigid platform 20 between the three different basic positions which are shown in FIG. 6. In position "A," the platform is horizontal and near ground level 21. In position "B," the platform is raised and horizontal adjacent to the truck bed or dock. In position "C," the platform is raised and upright in its elevated position rather than horizontal. Preferably it is substantially vertical so that it can closely be nested against the rear of the truck or against a building so as to close them to entry.

To manipulate the platform between the three positions, a mechanism is provided which will further be described below. Two modes of operation are provided. Mode I is the movement between positions "A" and "B", wherein the platform remains horizontal while it moves from its lowermost to its uppermost position, and the reverse. Mode II (second mode) is the movement between positions "A" and "C", and reverse. In the second mode, the platform is substantially horizontal in its lower position and during the first part of its upward movement. Midway in its rise it begins to tilt, and when at the limit of its upward movement is erect.

The platform is mounted to the attachment member for this manipulation by means of a hinge 25. Hinge 25 is a "compound" hinge in that there is rotational movement relative to a next assembly at both edges, i.e., relative to the support structure and to the platform. In order to resist eccentric loads on the platform, the hinge is provided in two sections, sections 26 and 27 (see FIG. 1). With the exception of restraint means yet to be described which is provided only in section 27, these sections are mirror images of one another. It is not necessary for two sections to be provided. Only one, such as section 27 could be used. However, providing the use of a pair of them provides a balanced structure, as will be seen.

A primary pivot 30 is provided for mounting the hinge to the support structure. It comprises four flanges 31, 32, 33, 34 and two pins 35, 36 each supported in a respective pair of flanges. The flanges are welded to the support structure, and the pins are axially aligned with one another. Flanges 31, 32 and pin 35 form a portion of section 26. Flanges 33, 34 and pin 36 form a portion of section 27.

Each section of the hinge comprises a parallelogram movement having four links. Base links 37, 38 are provided in sections 26 and 27, and are freely pivotally mounted to the primary pivot by pins 35 and 36, all respectively.

First parallelogram links 39, 40 are provided in sections 26 and 27 respectively. They are pivotally connected to base links 37 and 38 at their lower ends by pins 41 and 42. Second parallelogram links 45, 46 are respectively mounted to the primary pivot at pins 35 and 36 for free rotation thereon. The fourth link is platform links 49, 50 formed as part of the platform itself. First parallelogram links 39 and 40 are pivotally connected to platform links 49 and 50 by pins 43 and 44. Second parallelogram links 45 and 46 are pivotally connected to platform links 49 and 50 by pins 47 and 48. The lengths of the first and second parallelogram links and of the base and platform (fourth) links, are substantially equal. Exact equality is not required. Frequently one is slightly larger than the other so the platform will "dip" a bit at its position A. A suitably small difference does not exclude the construction from the scope of a "parallelogram structure." Equality or substantial equality of lengths and spacings as stated, result in said "parallelogram structure," rotatable around primary pivot 30. The platform link (sometimes called a "fourth" link) may be formed by rigid structure connecting the pins 43 and 47, and pins 44 and 48, for example the rigid platform structure. The spacings 51 between pins 43 and 47, and between pins 44 and 48 are substantially equal to those between pins 36 and 42 and between pins 35 and 41 respectively, but may be different, as aforesaid.

Limiting means 55 is provided beneath the support means in the form of a threaded bolt 56 which limits the permissible extent of counter clockwise movement of the base links.

Motor means 60 comprises a piston-cylinder combination comprising a cylinder 61, piston 62, and piston rod 63. Fluid under sufficient pressure introduced into the cylinder through conduit 64 retracts the piston into the cylinder and raises the platform. Fluid can be exhausted from the conduit to permit the rod to extend and the platform to be lowered. The motor means (which could be other than hydraulic, for example an electrically driven threaded lead screw) is mounted to the support structure by a trunion 65 welded thereto. A pin 66 forms part of the trunion. A tongue 65a on the cylinder is rotatably mounted to pin 66. The trunion supports the cylinder against axial movement. The cylinder can rotate around the axis of pin 66. The motor means is adapted to exert an axial force on the piston rod for raising the platform. The reverse movement of the piston rod will be caused by gravity's lowering the platform.

The piston rod is attached to a cross-member 68 by a bearing connection 69. Member 68 is connected to both of the second parallelogram links. Therefore the force from the motor means is exerted as a balanced force on the platform. The proportions of the device are such that the rod can extend far enough to permit the platform to lower to the position of FIG. 2, and retraction of the rod will move the platform to the position either of FIGS. 3 and 4 as selected. The drawings are made substantially to scale. However, persons skilled in the art will have no difficulty in scaling the drawings, or changing the relative locations of the pins in order to secure a desired operation.

Restraint means is provided in section 27 for determining which of the parallelogram configurations the parallelogram structure is to assume, and therefore which of the modes will occur in operation. Restraint means 70 comprises a selector 71 which is pivotally mounted to a pair of ears 72 on the attachment means. A handle lever 73 is provided to move the selector from between the positions shown in FIG. 3 and 4. It is spring-loaded by coil spring 73a toward the position of FIG. 3. As best shown in FIG. 1, the selector is attached to a rotatable pivot pin 74 that is journaled in the ears, and includes a recess 75 (sometimes called "contact surface") for purposes yet to be described. It also includes a pair of fingers 76, 77 with rounded ends 78, 79. Also, this selector carries a stud 80 that projects from its sides for purposes yet to be described.

The restraint means further includes a scissor linkage 81 comprising a first and a second scissor link 82, 83 respectively Link 82 is pivotally mounted to the first parallelogram link 40, and the second scissor link 83 is mounted to bearing bolt 36, both for free rotation. The two links are joined by a hinge bolt 84. Link 82 has a tapered end 85 projecting to the right of hinge bolt 84 in FIG. 4 for possible interaction with stud 80.

The operation of this device will now be described. Assume that the platform is first in its position "A" as shown in FIGS. 2 and 6. At this time, the piston rod will be extended, and the platform will rest on the ground, or will be held at such lower elevation as is permitted and determined by the extension of the rod.

Assume it to be the objective to move the platform from position "A" to position "B" in the first mode of operation, wherein the platform is maintained horizontally. The attainment of this objective is shown in FIGS. 2 and 6. At this time, the selector 71 is turned upwardly out of the way into the position shown in FIGS. 1 and 2. The load of spring 73a favors this setting. In this mode of operation, the restraint means has no effect. Also in this mode, the base link bears against limiting means 55, and the position of the base link is determined by the location of the end of bolt 56. The weight of the platform caused this orientation of the base link.

For raising the platform to position "B", hydraulic fluid under pressure is injected into conduit 64 from any convenient source such as a pump or accumulator, and the rod 63 is retracted into the cylinder as the piston moves upwardly in FIG. 1 and upwardly and to the right in FIG. 2.

Because trunnion 65 is offset from primary pivot 30, and the connection 69 of the piston rod with crossbar 68 is disposed so as to form a triangle, i.e., off of the straight line drawn between pivot 30 and trunnion 65, this retraction will cause the second parallelogram link to rotate clockwise in FIG. 2 to approach the position of FIG. 3. It will be seen that the parallelogram configuration is now primarily defined by the position of the base link which because of the weight of the platform and of the compound hinge, is caused to bear in a counter-clockwise direction around primary pivot 30 against limiting means 55. The upward parallelogram movement will result in the platform links 49 and 50 remaining substantially parallel to the base link, in which orientation the platform is substantially horizontal. The platform will remain substantially horizontal during its movement from position "A" to position "B", connected for movement from the "dip" at position "A" if one is provided.

Attention is called to scissor linkage 81. With the selector 71 out of the path of any part of the scissor linkage, the scissor linkage simply pivots and has no effect on the parallelogram configuration.

The weight of the platform will cause the expulsion of fluid from the cylinder when conduit 64 is opened to exhaust, and the platform will return to position "A". The rate of return can be controlled by conventional restrictor valving in conduit 64. It will be observed that there is no possibility of uncertainty of mode of operation in mode I, for the reason that nothing is operative to change the parallelogram configuration, it being determined in this mode by the position of the limiting means.

Movement from position "A" to position "C" (Mode II) is shown in FIGS. 2 and 4. Starting at the position of FIG. 2, the selector means is rotated counter-clockwise against its spring load to the position shown in FIG. 4 before the platform is raised. Its extreme position is limited by its bearing against adjacent structure as shown in FIG. 4. The operator will know the setting of the selector by observing the position of hand lever 73. In the initial upward movement of the platform, the movement is basically that of a horizontal platform movement as in mode I, with the base link bearing against the limiting means as in FIG. 2, but before the end of the piston stroke, hinge bolt 84 will enter recess 75 as shown in FIG. 5. At this time the situation changes markedly, because instead of permitting free movement of the first parallelogram links as in the motion from positions "A" to "B" wherein the parallelogram configuration is determined by the position of the base link, now the position is determined by the abutment of hinge bolt 84 in recess 75. This defines the second mode.

It is evident that the restraint means could be made in configurations other than a pin and recess, and that these parts could be reversed. The essential feature is that an end of scissor link 82 be restrained, and that it translates this restraint to the first parallogram link.

Under these circumstances, a restraint is made on the first parallelogram link 40, and as the piston rod continues to raise the second parallelogram link, the parallelogram configuration must adapt itself to that restraint. The weight of the device is exerted through scissor link 82 against the selector so that they are firmly held against one another. There is a limited arcuate movement of the end of the link 82 at pivot 86. This pivot mounts scissor link 82 to first parallelogram link 40 around hinge bolt 84. The combination of permissible movements translates into a clockwise rotation of the base link to the position shown in FIG. 4. The platform link remains parallel to it, because the parallelogram links are all pivotable relative to one another, and are all rigid. Thus in the second mode of operation from positions "A" to "C", there is an initial upward horizontal movement during which the condition is much as shown in FIG. 3 until the restraint means assumes control. Then the parallelogram configuration in the second mode changes to that which is shown in FIG. 4, wherein because of this restraint the platform link is rotated clockwise around its inboard bearing and raises the platform to an erect position.

Up-stop 101 on the platform defines the upper limit of movement of the platform in the second mode by contacting the first parallelogram link.

The return movement to ground elevation is the reverse of the foregoing. When fluid is exhausted from the motor means, the platform returns to the horizontal and returns to the ground. Thereafter the selector may be placed in either of its selectible configurations.

This construction has features which contribute to its reliability. One of these features comprises the reaction between stud 80 and tapered end 85. It is undesirable for there to exist a condition in a mechanism of this type wherein midway in the operation the mechanism itself can "decide" to go in either direction. In order to avoid this situation, should tapered end 85 be on one side or ther other of the stud, then it will positively cause the selector to assume one position or the other. For example, in the position of FIG. 4, there is no way in which the stud could ever have been on the other side of the upper end edge of scissor link 82 and the lift be in its second mode. The tapered surface would have kicked the link by striking the stud. This would assure that the selector will be and remain in the position shown in FIG. 4 (second mode). If, on the other hand, the setting had been such that the selector was in a position that the end of scissor link 82 would contact the lower part of the stud, it would have kicked the selector up so as to assure operation in the first mode. The construction is such that there could be no uncertainty because the stud must be one one side or the other of end 85. Also, as can be seen in FIG. 4, when established in the second mode, the selector is trapped between hinge bolt 84 and finger 76 and between the tapered surface 85 and stud 80. It is impossible to move the selector to its other setting when the scissor linkage is fully engaged to the selector.

The terms "erect" and "upright" as used herein mean non-horizontal. They are not limited to verticality. The erect position of the platform is a function of its position relative to the platform links, and of their position relative to the horizontal. Also, the term "horizontal" includes a sloping platform. It is not limited to an absolutely level arrangement.

It is observed that the selector and the restraint means are relatively short and can be made quite strong and rigid. Instead of using only single pieces of material, the hinge and other structures can be balanced by use of forks and the like as shown. This reduces or eliminates eccentric loads. However, if less structure is desired, then the platform can be braced to receive eccentric loading. This device is therefore rugged and foolproof against release by vibration such as by shaking the selector loose in mid-operation, or of uncertainty, because the restraint means must go one way or the other in operation.

It is also possible to connect the piston directly to the second parallelogram link, instead of through bar 68.

The term "support structure" means structure to which the various attachment means are attached. It is, of course, possible to attach the attachment means individually to a truck frame or the like, which will constitute support structure, but best industrial practice is to attach them to a rigid beam or tube (as shown) at the factory.

As a guide to designers, the following suitable dimensions and coordinate in inches are given relative to center 100 as shown in FIG. 4. The X axis being horizontal and the Y axis vertical.

|  | X | Y |
|---|---|---|
| Shaft 74: | +2.84, | +2.84 |
| Principal pivot 30: | −4.00, | 0.00 |
| Pivot 66: | −5.13, | +3.38 |
| Hinge bolt 84 when in the position of FIG. 4: | −5.75, | +4.00 |
| Plan length between pins: |  |  |
| 30, 42: | 2.75 |  |
| length 51: | 3.00 |  |
| 30, 47: | 25.00 |  |
| 41, 43: | 25.00 |  |

The above are the most critical dimensions. The dimensions of the scissor linkage and of the selector can be suited to the installation.

This invention is not to be limited by the embodiment shown in the drawings and described in the description which is given by way of example and not of limitation, but only in accordance with the scope of the appended claims.

I claim:

1. A platform lift for operation relative to support structure comprising: a platform adapted to assume a first substantially horizontal lower position, a second substantially horizontal upper position, and an upper erect position; hinge means attachable to the attachment member and to the platform for moving a platform selectively between the said positions, said hinge comprising a parallelogram linkage including a base link pivotally mounted to a principal pivot, said pivot being adapted to be attached to the support structure, a first parallelogram link pivotally connected to said base link at a point spaced from the principal pivot, a second parallelogram link pivotally connected to the principal pivot, the pivots of the first and second parallelogram link being substantially equally spaced apart, and a platform link mounted to the platform and pivotally connected to both of two parallelogram links at a space substantially equal to that of the spacing of pivots on the base link, whereby to form said parallelogram linkage; motor means connected to said support structure; limit means adapted to be connected to said support structure for determining the angular position of the base link in one mode of operation; and restraint means for determining the parallelogram configuration in another mode of operation, said restraint means comprising a member having a contact surface adapted to be connected to said support structure, and a scissor linkage having a first and second scissor link respectively pivotally connected to the first parallelogram link and adapted to be pivotally connected to the support structure, said scissor links being pivotally joined by last named hinge means, said hinge means being adapted to contact said contact surface in one position of the restraint means, said restraint means bing removable from said position.

2. Apparatus according to claim 1 in which the restraint means comprises a pivoted body which carries said contact surface.

3. Apparatus according to claim 2 in which said restraint means includes a stud, and in which the first of said scissor links includes a portion which is adapted to rest on one side or the other of said stud.

4. Apparatus according to claim 3 in which the said stud, when the last-named hinge means contacts the contact surface, is prevented by the first scissor link from passing by said first scissor link, whereby to prevent the position of the restraint means from being changed.

5. Apparatus according to claim 4 in which the motor means is a piston-cylinder combination.

6. Apparatus according to claim 5 in which a pair of said first named hinge means is provided.

7. Apparatus according to claim 2 in which said contact surface is a recess in the said member.

8. Apparatus according to claim 7 in which said restraint means includes a stud, and in which the first of said scissor links includes a portion which is adapted to rest on one side or the other of said stud.

9. Apparatus according to claim 8 in which the said stud, when the last-named hinge means contacts the contact surface, is prevented by the first scissor link from passing by said first scissor link, whereby to prevent the position of the restraint means from being changed.

10. Apparatus according to claim 1 in which said platform lift includes said support structure, said structure being rigid, and said elements which are adapted to be joined thereto being attached to said support structure, whereby to form an integral structure which can be attached to a vehicle.

11. Apparatus according to claim 10 in which the support structure is a rigid tube.

12. Apparatus according to claim 10 in which the restraint means comprises a pivoted body which carries said contact surface.

13. Apparatus according to claim 12 in which said restraint means includes a stud, and in which the first of said scissor links includes a portion which is adapted to rest on one side or the other of said stud.

14. Apparatus according to claim 13 in which the said stud, when the last-named hinge means contacts the contact surface, is prevented by the first scissor link from passing by said first scissor link, whereby to prevent the position of the restraint means from being changed.

* * * * *